Aug. 8, 1961 B. R. COLE ET AL 2,995,748
RELIABILITY CHECK CIRCUITS
Filed Feb. 4, 1959 2 Sheets-Sheet 1

INVENTOR.
BENJAMIN R. COLE
EDWARD J. SHELDON
BY
H. H. Loesch
ATTORNEYS

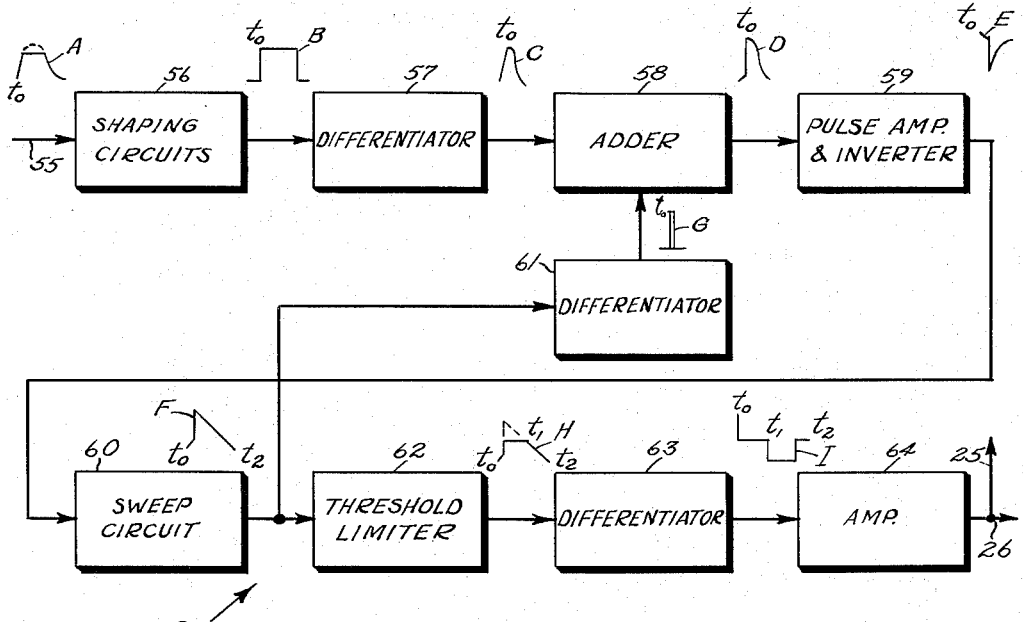

United States Patent Office 2,995,748
Patented Aug. 8, 1961

2,995,748
RELIABILITY CHECK CIRCUITS
Benjamin R. Cole, Arlington, and Edward J. Sheldon, Lexington, Mass., assignors, by mesne assignments, to the United States of America as represented by the Secretary of the Navy
Filed Feb. 4, 1959, Ser. No. 791,240
7 Claims. (Cl. 343—17.7)

This invention relates to reliability check circuits for velocity meters of the chronograph type and more particularly to a circuit for checking by calibrating means the functioning accuracy of a chronograph utilizing Doppler radar for making velocity measurements of projectiles, such as missiles, bullets, or the like.

The use of Doppler radar in making velocity measurements is well known, and it is also well known to provide a chronograph utilizing Doppler radar to obtain velocity measurements of very rapidly moving objects accurately over short periods of time, chronograph or chronoscope being used in the dictionary sense of instruments to measure the velocity of projectiles. As the speed of projectile objects is increased in our time of high fire power and high speed missiles, the requirement for accuracy becomes more acute. It is not enough that a chronograph instrument be checked daily or hourly, but it is necessary that such chronographs be checked every few minutes for recalibration of the circuit to accomplish a minimization of circuit changes caused by drift or malfunction producing errors in the chronograph results.

In the present invention a reliability check circuit is incorporated in a velocity meter or radar chronograph for measuring the muzzle velocity or launching velocity of a projectile, such as a missile or a bullet. In this invention the reliability check circuit is made to be switchable in and out of a Doppler radar circuit to check the echo radar signal between projectile firing periods with the aid of a simulated target signal. At any time malfunction appears in any of the circuitry to cause a simulated signal to deviate too much from a reference velocity signal, the reliability check circuit becomes operative to switch a predetermined velocity voltage reference to indicate the velocity most probable for the projectile used and to disable or disconnect the radar chronograph until the malfunction is found and corrected. In the present invention a calibration and limit control circuit is switchably operative to apply a simulated radar signal on a modulated carrier having a fast envelope rise time simulating that produced by the firing of a projectile. This simulated radar signal is applied through the transmitter and fed through to the receiver, producing a simulated echo Doppler signal which is limited in an amplifier-limiter and applied to a counter-memory circuit and to an emergence and timing circuit. The counter-memory circuit is a frequency converter which converts the Doppler frequency to a direct current analog velocity voltage, which direct current voltage is stored in a storage network. The stored direct current voltage is periodically checked with a reference voltage in the calibration and limit control circuit which voltages, if different, will cause a change of bias in the counter-memory circuit to recalibrate the system for circuit changes or irregularities. The emergence and timing circuit utilizes the fast rise time of the received echo signals to produce a voltage signal delayed a predetermined period of time for application to the counter-memory circuit to count the Doppler frequency and memorize the analog velocity voltage proportional thereto after a predetermined time following projectile burst or muzzle emergence. The calibration and limit control circuit likewise determines when the stored analog velocity voltage and reference voltage exceed certain limits to produce a limit control voltage indicating that malfunction in the Doppler radar and related circuitry exists. This limit control voltage is operative in a reliability relay circuit to produce relay operation for switching the counter-memory stored analog velocity voltage from a velocity voltage utilization circuit to prevent further utilization of this stored voltage representative of the velocity of the missile or projectile on which measurement is being made. Upon such malfunction the velocity utilization circuit is switched to a velocity reference voltage that is established at an amplitude proportional to the probable velocity of the projectile or missile for which the chronograph is used. The reliability check circuit will maintain the relay in the "unreliable state" so long as the malfunction exists. When the malfunction is corrected the reliability relay will return to its "reliable state" in which actual velocity measurements of a projectile or missile may be made or the velocity measurements of simulated Doppler signals may be made. It is therefore a general object of this invention to provide an automatic reliability check circuit that is operative whenever actual velocity measurements of a projectile are not being made to calibrate the Doppler radar system and related circuitry with simulated radar and echo signals, producing constant surveillance of the chronograph system for accurate measurements.

These and other objects, advantages, features, and uses may become more apparent to those skilled in the art when referring to the accompanying drawing in which:

FIGURE 3 illustrates in a block circuit diagram the emergence and timing component of FIGURE 1.

Figure 1:
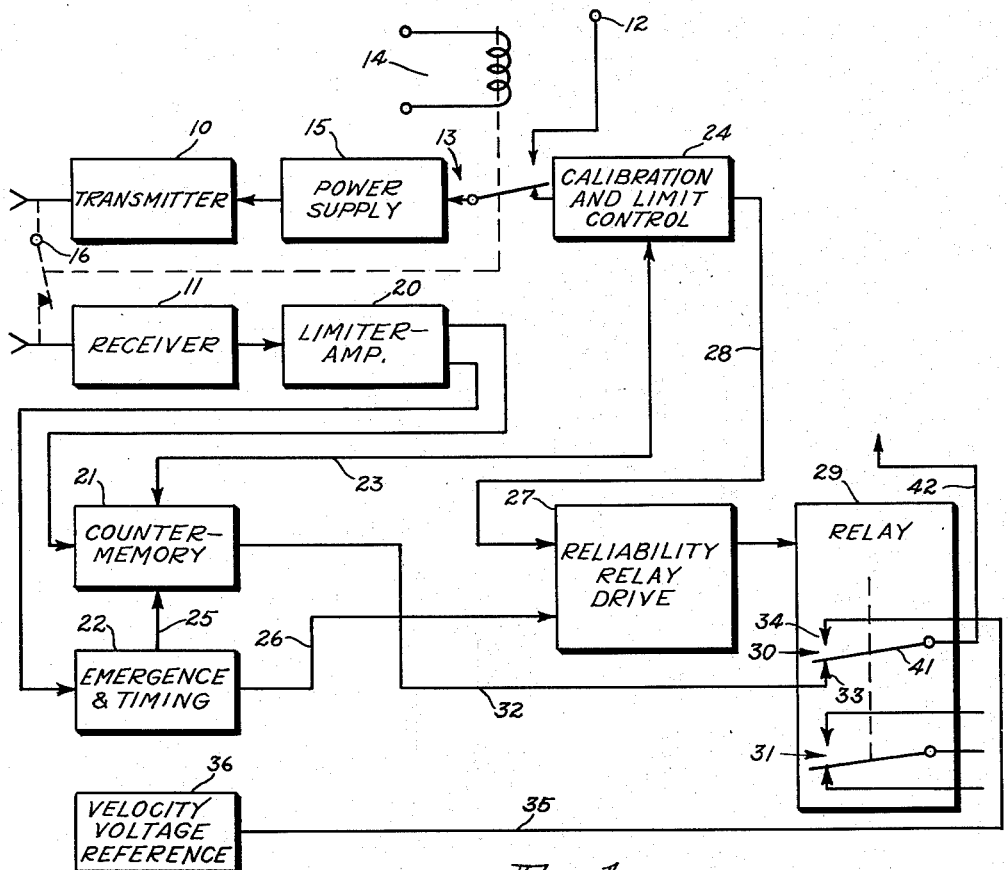
FIGURE 1 illustrates a block functional diagram of the reliability check circuit incorporated in a Doppler radar system.

Referring more particularly to FIGURE 1, there is illustrated by block diagram a radar transmitter 10 and a radar receiver 11 in separate blocks, although not limiting the invention to separate radar transmitters and receivers but to radars as well that may have a single radar transmitter and receiver with a transmit-receive switching means for a single antenna. The transmitter 10 is supplied normal radar signals from a source such as a magnetron, as is well understood in the art, to a terminal 12, shown herein as being coupled through an electromagnetic relay switch means 13, which switch means may have the actuating coil 14 coupled to circuitry (not shown) for automatic switching or otherwise, as desired. The relay 14 may be under the control of projectile or missile firing circuits to utilize the reliability check circuit when firing is inactive. The radar transmitter is supplied the power as necessary or required by a power supply source 15, as is well understood in the art. The electromagnetic relay 14 likewise mechanically switches a circuit coupling the transmitter and receiver antennas together for feedthrough of simulated signals, as shown by the switch 16. When the regular radar pulse source applied at 12 is coupled through switch 13 to the transmitter 10, the antenna switching means 16 is open so that the radar system will operate in the usual manner to cause echo signals to be received by the receiver when the transmitter 10 illuminates a target object to be measured in velocity.

The output of the receiver 11 is applied through a limiter amplifier 20 to limit as well as amplify Doppler echo signals received. The output of the limiter amplifier 20 is coupler to a counter-memory circuit 21 and to an emergence and timing circuit 22. The counter-memory circuit may be of any well-known type such as a storage counter circuit to convert electric frequency signals into direct current and store or memorize this direct current analog for use as shown and described in the text "Pulse and Digital Circuits," chapter 11, by Milam and Taub, McGraw-Hill Book Company, 1956, but preferably is of the type shown and described in our patent application, Serial No. 784,010, filed on December 30, 1958, now U.S. Patent No. 2,985,838. This counter-memory circuit 21 receives the Doppler frequency and converts this frequency to a direct current voltage proportional to the Doppler frequency. This direct current voltage is an analog voltage of the velocity of the object producing the Doppler echo signals and this analog velocity voltage is stored, as more fully described in our above-mentioned patent application. The stored direct current analog velocity voltage is compared through the functional lead 23 to a reference voltage in a calibration and limit control circuit 24. Any difference in the compared voltages is operative through the functional lead 23 to change the bias in the counter-memory circuit to recalibrate this counter-memory circuit at frequent times to correct for any drift or other means producing erroneous analog velocity voltages. This recalibration at intervals of the counter-memory circuit is better shown and described in our patent No. 2,919,401, granted on December 29, 1959. The calibration and limit control circuit 24 has other functions which will be more fully described hereinbelow.

The emergence and timing circuit 22 receives the Doppler echo signals, which signals, when produced by either an actual target object or by a simulated echo signal, utilize the fast envelope rise of the Doppler envelope to establish an initial time base from which timing of all circuits may be accomplished. This emergence and timing circuit 22 will soon be described separately with reference to FIGURE 3 but constitutes the subject matter of two separate inventions. The initial emergence signal establishing the time base is produced by a circuit shown and described in our patent application, Serial No. 790,895, filed on February 3, 1959, and a timing circuit for producing a time delay from the emergence signal is more fully shown and described in our patent application, Serial No. 784,410, filed on December 31, 1958, now U.S. Patent No. 2,939,004. The delayed timing pulse is applied through the functional conductor means 25 to the counter-memory circuit to prevent the counter-memory circuit from counting the frequency or converting the frequency to the analog velocity voltage until a time elapse sufficient to eliminate the blast effect of the projectile or missile on the Doppler receiver. That is, on projectile firing, as the projectile or missile enters the atmosphere, a blast is produced which produces the initial fast rise in the Doppler envelope which is unwanted in the measurement of velocity of that projectile or missile. By the delay timing means the projectile or missile velocity can be measured over a short period of its path, for example, for approximately five to twenty feet from the launching or muzzle site, thereby eliminating any erroneous velocity measurements by reason of initial blast or atmospheric separation. The delayed timing pulse is likewise applied by way of the functional conductor means 26 to a reliability relay drive circuit 27, as will be described more fully hereinafter.

The calibration and limit control circuit 24 includes a stable oscillator for producing a frequency capable of simulating a Doppler frequency which will be converted in the counter-memory circuit to a predetermined analog velocity voltage. This simulated signal of the calibration and limit control circuit 24 produces a limit control voltage, as hereinbefore stated, which is applied through a functional conductor means 28 as a second input to the reliability relay drive circuit 27. Whenever projectile firing ceases, the electromagnetic relay 14 is caused to be actuated, either manually or automatically, to place the calibration and limit control circuit 24 in circuit with the radar transmitter 10 through the power supply means 15 and to provide a feedthrough coupling through the transmitter and receiver antennas, whereby the simulated Doppler frequency is applied through the transmitter and receiver circuitry to the counter-memory circuit 21 and the emergence and timing circuit 22. In this manner the transmitter and receiver circuit may be placed in circuit with the calibration and limit control circuit and the counter-memory circuit to calibrate the Doppler frequency for a predetermined analog velocity voltage. If there is any deviation, within limits, of the analog velocity voltage and the reference voltage in the calibration and limit control circuit, the counter-memory circuit bias will be changed, recalibrating the transmitter and receiver and counter-memory circuit to accurate measurement. The counter-memory circuit therefore provides analog velocity voltages for both actual projectile or missile velocity or for simulated projectile or missile velocities produced by the calibration and limit control circuit.

The reliability relay drive circuit 27 and the relay switches illustrated in block by 29 constitute the reliability relay circuit of this system. The reliability relay drive circuit 27 is operative under the conditions of the emergence timing signal, entering by a conductor means 26 and the limit control voltage coming by way of the functional conductor means 28. The reliability relay drive circuit electromagnetically controls the switches 30 and 31, each of which is a double-pole, single-throw switch although other switches of different pole and throw types may likewise be actuated thereby. The analog velocity voltage stored in the counter-memory circuit 21 is conducted by the functional conductor means 32 to the contact 33 of switch 30. The alternate contact 34 of switch 30 is coupled by functional conductor means 35 to a velocity voltage reference 36. The velocity voltage reference 36 is a direct current voltage which may be adjustable or fixed for the most probable velocity of the projectile or missile used. The switch 31 is not shown as being coupled to any circuitry herein, but is included to illustrate that such a switch may be used to control or cut off circuitry in the Doppler radar and receiver system as necessary or required in a manner well understood in the art.

A velocity utilization circuit may be coupled to the switch blade 41 of the double-pole, single-throw switch 30 of the reliability relay 29 through a functional conductor means 42. Whenever the reliability relay 27, 29 is de-energized, the system is considered to be in the "reliable state," and the relay switch blade 41 connects the contact 33, placing the analog velocity voltage of the counter-memory circuit 21 in circuit with the output 42. The velocity utilization circuit coupled to the output 42 may be a velocity indicator or a circuit for projectile control, or both. Where a velocity indicator becomes a part of the circuit coupled to the output 42, this meter will convert the direct current voltages applied thereto as analog velocity voltages to feet per second, miles per hour, or other like velocity indications. Whenever the reliability relay 29 is energized to place the switch blade 41 into contact with the contact 34, the circuit is considered to be in the "unreliable state" in which the output 42 is coupled to the velocity voltage reference 36 to provide an analog velocity voltage considered probable for the projectile or missile used when velocity measurements are being made.

Figure 2:
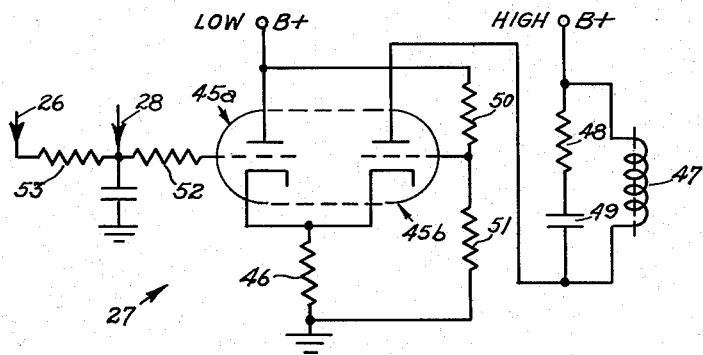
FIGURE 2 illustrates a circuit schematic diagram of the reliability relay drive circuit.

Referring more particularly to FIGURE 2, one illustration of a reliability relay drive circuit 27 is shown wherein two triodes or a double triode tube 45a and 45b is shown cathode coupled to provide a cathode follower amplifier tube circuit. The cathodes are coupled in common through a cathode resistor 46, and the anode of triode tube section 45a is coupled directly to a low voltage anode supply source. The anode of the triode tube section 45b is coupled in parallel through an electromagnetic relay coil 47 and a resistance 48 and capacitance 49 in series to a high anode voltage supply source. The grid of the triode tube section 45b is fixed by a voltage divider circuit consisting of resistors 50 and 51 between the low anode voltage supply source and ground. The grid of the triode tube section 45a is coupled through resistors 52 and 53 in series. The timing pulse coming by way of the functional conductor 26 to the reliability relay drive circuit is applied through both resistors 52 and 53, and the limit control voltage coming by way of the functional conductor 28 is applied at the junction of resistors 52 and 53. When the voltage coming from the emergence and timing circuit 22 over the conductor means 26 is in the form of a square wave producing a positive voltage on the grid of the tube section 45a, tube section 45a is conducting and tube 45b is nonconducting or conducting too little to cause the relay coil 47 to be energized sufficiently to actuate relay 29. This condition exists although the voltage over the conductor 26 changes, the condition only causing the conduction of tube sections 45a and 45b to vary but insufficiently to energize relay coil 47 sufficiently for relay operation. Whenever the calibration and limit control circuit produces a drop in limit control voltage, which indicates malfunction in the radar circuit, the conduction of tube section 45a will be decreased or cut off, reducing the cathode voltage on the tube section 45b, producing conduction of this tube section sufficiently to energize the relay coil 47, thereby switching the switch blade 41 in the relay 29 to the contact 34. The resistance 48 and the capacitor are in series across the relay coil 47 to absorb the inductive effects when the relay is suddenly de-energized.

Referring particularly to FIGURE 3 the emergence and timing circuit, illustrated by the block 22 in FIGURE 1, includes an input conductor 55 over which the limited Doppler voltage wave is applied from the limiter amplifier 20 as shown by A. This Doppler wave is shaped in the shaping circuit 56 to produce a substantially square wave B applied to a differentiator 57, the output of which produces the differentiated voltage wave C. The voltage wave C is conducted through an adder circuit 58 to produce the voltage wave D applied to a pulse amplifier and an inverter circuit 59 and the inverted output wave E is conducted to start a sweep circuit 60 to produce the sweep voltage F. The sweep voltage F is applied to a differentiator circuit 61 and also to a threshold limiter circuit 62. The differentiated sweep voltage F produces a voltage spike G which is added in the adder circuit 58 to the voltage waveform C to produce a sharp leading edge in the waveform D. The threshold limiter limits the voltage swing, in this case the positive voltage amplitude of the voltage waveform F, to produce a clipped voltage waveform H. The various waveforms A through H show the initial point by the reference character $t_0$ to establish the time relation of the initial limited Doppler radar voltage pulse with respect to the voltages developed in this circuit. The point at which the threshold limiter 62 clips the voltage wave F determines the delay time $t_1$ from the time $t_0$. Voltage waveform H is differentiated in the differentiator circuit 63 to produce the waveform I, the square voltage wave $t_1$, $t_2$ being the voltage amplified in 64 and applied over the conductor means 25 and 26 to the counter memory circuit 21 and to the reliable relay drive circuit 27, respectively.

The elements shown in block in FIG. 3 are conventional and well-known although the combination is new as better set forth in the above-mentioned and identified patent disclosures.

In the operation of this device, let it be assumed that the electromagnetic relay switch means 14 is in a state of energization in which the radar pulse signal source 12 is in circuit through the power supply means 15 to the transmitter 10 and the switch 16 contacts are broken. Any projectile or missile being fired will be illuminated by the transmitted radar signal and the echo signal received back will be compared in the receiver 11 to produce Doppler frequencies, as is well understood in the Doppler radar art. The Doppler frequency is limited in the limit amplifier 20 and applied to both the counter-memory circuit 21 and the emergence and timing circuit 22. The emergence and timing circuit 22 will utilize the initial or first Doppler frequency in the Doppler envelope to produce a time delay voltage signal applicable through the conductor means 25 to hold the counter-memory circuit 24 cut off for a predetermined short interval of time, after which the counter-memory circuit will convert a short period of the Doppler frequency into analog velocity voltage for storing same. The analog velocity voltage will be applied through the conductor means 32, switch blade 41, and conductor means 42 to the output circuit 42 for projectile or missile control and velocity measurement indications. Upon cessation of firing of projectiles or missiles for a predetermined short interval of time, the electromagnetic relay 14 will be de-energized to place the calibration and limit control circuit 24 into communication with the transmitter 10 through the power supply 15 and cause a feedthrough from the transmitter antenna to the receiver antenna. The calibration and limit control circuit 24 provides a radar frequency simulating transmitter frequency which is received by the receiver 11 to produce Doppler frequency, which is likewise applied to the counter-memory circuit 21 and the emergence and timing circuit 22, as described hereinbefore. At any time that the analog velocity voltage stored in the counter-memory circuit deviates a predetermined excessive amount from the reference voltage in the calibration and limit control circuit such that a correction of the bias voltage in a counter-memory circuit cannot be accomplished, a limit control voltage will be applied through the conductor means 28 to the reliability check circuit 27 to cause relay operation to place the output 42 in circuit with the velocity voltage reference 36 if the timing voltage is likewise being applied. The velocity of the projectiles or missiles being fired will be computed from the velocity reference voltage so long as the malfunction condition lasts, as indicated by the presence of a limit voltage applied through the conductor means 28 to the reliability relay drive circuit. When the malfunction is corrected, the control voltage on the conductor means 28 will disappear and the relay 27, 29 will return to its normal position in which the switch blade 41 is in contact with the contact 33. When the reliability relay is in the de-energized condition, as shown in FIGURE 1, with the switch blade 41 resting on contact 33, the Doppler radar system and its related circuitry are considered to be in a "reliable state," as hereinbefore stated. While the system is operating in the "reliable state," the calibration and limit control circuit and the counter-memory circuit cooperate to maintain the proper bias voltage on the counter-memory circuit so that the highest accuracy possible is maintained. Likewise, the cooperation between the two components 21 and 24 exists when the calibration and limit control circuit is applying simulated radar signals through the Doppler radar transmitter and receiver system. In this manner the reliability check circuit automatically maintains the Doppler radar circuit or chronograph for maintaining substantially accurate velocity measurements and is operative to disable the velocity measurements whenever a malfunctioning element appears to exist in any of the Doppler radar or chronograph circuitry, thereby avoiding the possibility of making erroneous velocity indications to the velocity indications to the velocity utilization circuit which may incorporate a velocity measurement indicator.

While many modifications and changes may be made in the constructional and functional details of this invention to accomplish the end result of a reliability check circuit for a Doppler radar or chronograph, we desire to be limited only in the scope and within the spirit of our appended claims.

We claim:

1. A reliability check circuit for checking measurements of a chronograph comprising: a Doppler radar chronograph for making velocity measurements of an object; means switchable to produce simulated velocity signals of predetermined velocity measurement in said chronograph for checking the reliability of said chronograph; a velocity reference signal source of predetermined velocity measurement; a velocity measurement utilization output; and means responsive to reliability checks of chronograph velocity switchable to place said velocity measurement utilization output in communication with said chronograph during reliable velocity measurements and to place said velocity measurement utilization output in communication with said velocity reference signal source during periods of chronograph velocity measurement unreliability.

2. A reliability check circuit as set forth in claim 1 wherein said chronograph measures velocity by electromagnetic waves and said means switchable to produce simulated velocity signals of predetermined velocity measurement is a calibration and limit control circuit coupled to compare the velocity measurements of said chronograph with reference velocity signals and also coupled to said means responsive to reliability checks of chronograph velocity for switching same.

3. A reliability check circuit for checking velocity measurements of radar systems comprising: a radar transmitter and receiver means; an automatic calibrating and limiting control means for developing pulsed voltages representative of radar signals, a bias voltage, and a limit voltage, said calibrating and limiting control means having its pulsed voltages coupled to said transmitter for feedthrough to said receiver for receiving these pulsed voltages and developing simulated echo signals; a frequency counter circuit and an emergence and timing circuit coupled to said receiver, said frequency counter circuit converting pulsed frequency into a direct current analog velocity voltage at an amplitude corresponding to said frequency, and said emergence and limiting circuit providing a time delayed pulse for each initial emerging simulated echo signal received; a reliability relay circuit controlling relay contacts coupled to said automatic calibrating and limiting control means for receiving said limit voltage and to said emergence and timing circuit for receiving time delay pulses; a velocity voltage reference; an output coupled through said relay contacts alternately to said counter-memory circuit and said velocity voltage reference whereby operability of said radar transmitter and receiver means is automatically checked for reliability, unreliability causing said limit voltage to place said velocity voltage reference in circuit with said output.

4. A reliability check circuit as set forth in claim 3 wherein said automatic calibrating and limiting control circuit is coupled to said frequency counter circuit for comparing a reference voltage of predetermined amplitude with the direct current analog velocity voltage amplitude converted by said frequency counter to produce said limit voltage when said reference voltage and said direct current analog velocity voltage are exceeding predetermined limits.

5. A reliability check circuit as set forth in claim 4 wherein said reliability relay includes a vacuum tube relay voltage drive circuit for driving an electromatic relay of actuated electrical switches.

6. A reliability check circuit as set forth in claim 5 wherein said frequency counter is capable of memorizing said direct current voltage providing an analog quantity of the velocity measurement for comparison in said automatic calibrating and limiting control means and for use in said output.

7. A reliability check circuit for checking velocity measurements of a radar chronograph comprising: a Doppler radar transmitter and receiver system for making velocity measurements of projectiles; an automatic calibrating and limit control circuit for developing on one output thereof simulated radar pulses of a modulated carrier with a fast envelope rise for each simulated projectile, and said limit control circuit operative through a second output to produce a limit voltage signal indicative of unreliability; switch means at the input to said transmitter and between said transmitter and receiver switchable to couple said one output to feed through said Doppler radar transmitter and receiver; a frequency counter and memory circuit and an emergence and timing circuit coupled to receive Doppler echo radar signals on the output of said receiver, said frequency counter and memory circuit being constructed and arranged to convert the frequency of Doppler voltage pulses into a direct current analog velocity voltage proportional to the frequency converted and to store said direct current analog velocity voltage, and said emergence and timing circuit being constructed and arranged to utilize the envelope rise of each Doppler signal developed by said receiver and to produce a voltage signal of predetermined time delay to control the conversion period of said frequency counter, said counter-memory circuit having its stored direct current analog velocity voltage coupled to compare with a reference direct current voltage in said automatic calibrating and limit control circuit to produce said limit control voltage when said compared voltages exceed predetermined limits; a reliability relay for actuating switch contacts coupled to said second output of said automatic calibrating and limit control circuit for switching said relay upon the application of a limit control voltage, and said reliability relay being coupled to said emergence and timing circuit to operate in the presence of said time delay voltage signals; a velocity voltage reference of an amplitude of the most probable velocity of the projectile used; and a projectile velocity voltage utilization output, said projectile velocity voltage utilization output, said stored voltage of said counter-memory circuit, and said velocity voltage reference being coupled to said relay switch contacts to switch said projectile velocity voltage utilization output alternately with said counter-memory circuit and said velocity voltage reference whereby reliability of velocity measurements may be established by simulated means and a reliable velocity reference may be used during unreliable conditions in the radar chronograph.

References Cited in the file of this patent

UNITED STATES PATENTS

| | | |
|---|---|---|
| 2,591,731 | Shapiro | Apr. 8, 1952 |
| 2,830,289 | Zaleski | Apr. 8, 1958 |
| 2,836,813 | Flower et al. | May 27, 1958 |